(12) United States Patent
Walker et al.

(10) Patent No.: US 6,704,820 B1
(45) Date of Patent: Mar. 9, 2004

(54) UNIFIED CACHE PORT CONSOLIDATION

(75) Inventors: Shawn Kenneth Walker, Fort Collins, CO (US); Dean A. Mulla, Saratoga, CA (US); Terry L Lyon, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,033

(22) Filed: Feb. 18, 2000

(51) Int. Cl.[7] .............................................. G06F 12/00
(52) U.S. Cl. ...................................... 710/242; 710/119
(58) Field of Search ..................... 710/52, 33, 119–125, 710/242–243; 365/230.02

(56) References Cited

U.S. PATENT DOCUMENTS

| | | | | |
|---|---|---|---|---|
| 5,398,211 A | * | 3/1995 | Willenz et al. | 365/230.02 |
| 5,440,713 A | * | 8/1995 | Lin et al. | 711/158 |
| 5,630,097 A | * | 5/1997 | Orbits et al. | 710/33 |
| 5,640,527 A | * | 6/1997 | Pecone et al. | 365/230.02 |
| 5,754,865 A | * | 5/1998 | Itskin et al. | 710/241 |
| 5,815,509 A | * | 9/1998 | Deng et al. | 714/719 |
| 5,828,869 A | * | 10/1998 | Johnson et al. | 710/52 |
| 5,859,999 A | | 1/1999 | Morris et al. | 395/565 |
| 5,860,017 A | | 1/1999 | Sharangpani et al. | 395/800.23 |
| 5,943,691 A | * | 8/1999 | Wallace et al. | 711/172 |
| 5,950,229 A | * | 9/1999 | Jeddeloh | 711/150 |
| 5,961,631 A | * | 10/1999 | Devereux et al. | 712/207 |
| 5,974,540 A | * | 10/1999 | Morikawa et al. | 712/221 |
| 6,085,263 A | * | 7/2000 | Sharma et al. | 710/56 |
| 6,189,076 B1 | * | 2/2001 | Fadavi-Ardekani et al. | 711/147 |
| 6,195,735 B1 | * | 2/2001 | Krueger et al. | 711/204 |
| 6,212,607 B1 | * | 4/2001 | Miller et al. | 711/149 |
| 6,275,491 B1 | * | 8/2001 | Prasad et al. | 370/389 |
| 6,279,077 B1 | * | 8/2001 | Nasserbakht et al. | 710/52 |
| 6,314,499 B1 | * | 11/2001 | Kermani | 711/147 |
| 6,401,176 B1 | * | 6/2002 | Fadavi-Ardekani et al. | 711/151 |
| 6,557,078 B1 | * | 4/2003 | Mulla et al. | 711/122 |
| 6,560,674 B1 | * | 5/2003 | Hosogi et al. | 711/118 |

OTHER PUBLICATIONS

Wolfe, A., "Patents shed light on Merced's Innards", Electronic Engineering Times, Feb. 15, 1999.

* cited by examiner

*Primary Examiner*—Paul R. Myers

(57) ABSTRACT

A method and apparatus consolidate ports on a unified cache. The apparatus uses plurality of access connections with a single port of a memory. The apparatus comprises multiplexor and a logic circuit. The multiplexor is connected to the plurality of access connections. The multiplexor has a control input and a memory connection. The logic circuit produces an output signal tied to the control input. In another form, the apparatus comprises means for selectively coupling a single one of the plurality of access connections to the memory, and a means for controlling the means for coupling. Preferably, the plurality of access connections comprise a data connection and an instruction connection, and the memory is cache memory. The method uses a single memory access connection for a plurality of access types. The method accepts one or more memory access requests on one or more respective ones of a plurality of connections. If there are memory access requests simultaneously active on two or more of the plurality of connections, then the method selects one of the simultaneously active connections and connects the selected connection to the single memory access connection.

26 Claims, 2 Drawing Sheets

UNIFIED CACHE PORT CONSOLIDATION

TECHNICAL FIELD

The invention relates to computer memory systems. More particularly, the invention relates to accessing cache memories.

BACKGROUND ART

In a computer system, the interface between a processor and memory is critically important to the performance of the system. Because fast memory is very expensive, memory in the amount needed to support a processor is generally much slower than the processor. In order to bridge the gap between fast processor cycle times and slow memory access times, cache memory is utilized. A cache is a small amount of very fast memory that is used to store a copy of frequently accessed data and instructions from main memory. A processor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring the latency penalty of accessing main memory. If the data is not in the cache, then a cache read miss takes place, and the memory request is forwarded to the main memory, as would normally be done if the cache did not exist. On a cache miss, the data that is retrieved from the main memory is provided to the processor and is also written into the cache due to the statistical likelihood that this data will be requested again by the processor in the near future.

The individual data elements stored in a cache memory are referred to as lines. Each line of a cache is meant to correspond to one addressable unit of data in the main memory. A cache line thus comprises data and is associated with a main memory address in some way. Schemes for associating a main memory address with a line of cache data include direct mapping, full association and set association, all of which are well known in the art.

The presence of a cache should be transparent to the overall system, and various protocols are implemented to achieve such transparency, including write-through and write-back protocols. In a write-through action, data to be stored is written to a cache line and to the main memory at the same time. In a write-back action, data to be stored is written to the cache and only written to the main memory later when the line in the cache needs to be displaced for a more recent line of data or when another processor requires the cached line. Because lines may be written to a cache exclusively in a write-back protocol, precautions must be taken to manage the status of data in a write-back cache so as to preserve coherency between the cache and the main memory. The preservation of cache coherency is especially challenging when there are several bus masters that can access memory independently. In such a case, well known techniques for maintaining cache coherency include snooping.

A cache may be designed independently of the microprocessor, in which case the cache is placed on the local bus of the microprocessor and interfaced between the processor and the system bus during the design of the computer system. However, as the density of transistors on a processor chip has increased, processors may be designed with one or more internal caches in order to decrease further memory access times. An internal cache is generally small, an exemplary size being 256Kb (262,144 bytes) in size. In computer systems that utilize processors with one or more internal caches, an external cache is often added to the system to further improve memory access time. The external cache is generally much larger than the internal cache(s), and, when used in conjunction with the internal cache(s), provides a greater overall hit rate than the internal cache(s) would provide alone.

In systems that incorporate multiple levels of caches, when the processor requests data from memory, the internal or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory (or higher levels of caches, if present). Write operations are similar, with mixing and matching of the operations discussed above being possible.

Caches are also categorized on the basis of the type of information stored in their contents. For example, a data cache stores data (i.e., operands, integers, floating point values, packed representations and other formats of raw data). On the other hand, an instruction cache stores instructions (e.g., op codes or execution syllables with or without immediate data embedded in the instruction). If a single cache is utilized to store information of diverse types (e.g., data and instructions), then it is called a unified cache. A unified cache offers greater flexibility than one or more non-unified caches, in that the unified cache can flexibly store different types of information and therefore achieve a more efficient utilization of the valuable cache memory space.

A unified cache 100 is illustrated in FIG. 1. The unified cache 100 comprises a memory array 105, each element of which can store a unit of data or an instruction. The cache 100 also comprises a plurality of address ports. Each address port accepts an address bus. The address buses are shown alternately as data address buses DATA and instruction address buses INST. The width of each address bus is M bits. A given address uniquely identifies one cache line, or a subset of that one line, in the memory array 105. A conflict resolution and address decoder bank 110 processes the addresses on the address buses DATA and INST. The conflict resolution processing is described in detail below. The address decoding processing for each address bus involves decoding the address and selectively asserting word lines that access the addressed word in the memory array 105, such that the addressed word is connected to an I/O module 115. The I/O module 115 comprises drivers and sense amplifiers to write and read the addressed memory word, respectively, as determined by cache control logic. One or more I/O buses, coupled to the I/O module 115, accept or provide the addressed word(s).

Because a unified cache has a larger number of connections than a non-unified cache, a unified cache faces a substantially greater burden for resolving address conflicts. Address conflicts arise when two or more connections access the same memory cell at the same time. Resolving address conflicts in a rationale manner is important to avoid inconsistencies in the cache contents. For example, in FIG. 1, if the top address bus DATA accesses a particular cache line for writing, and the bottom instruction address bus INST attempts to read the same cache line, then it is important that the two operations proceed in the proper order. Otherwise, the wrong information would be read. To detect address conflicts, the conflict resolution and address decoder bank 110 contains logic that compares the address on each address bus to every other connection. Each comparison circuit requires M 2-input exclusive OR (XOR) gates, if the address buses are M bits wide. The number of comparison circuits increases as the square of the number of address buses to the cache 100. Specifically, N address buses to the cache 100 require "N choose 2" or $(N^2-N)/2$ comparison circuits. Thus, a small increase in the number of address buses results in a significant increase in the necessary comparison circuits. For example, if there are four address buses to the cache 100, then six comparison circuits are necessary; whereas, if there are eight address buses to the cache 100, then 28 comparison circuits are necessary.

SUMMARY OF THE INVENTION

In one respect, the invention is an apparatus for using a plurality of address buses with a single port of a memory. The apparatus comprises a multiplexor and a logic circuit. The multiplexor is connected to the plurality of address buses. The multiplexor has a control input and a memory connection. The logic circuit produces an output signal tied to the control input. In another form, the apparatus comprises a means for selectively coupling a single one of the plurality of address buses to the memory, and a means for controlling the means for coupling. Preferably, the memory is a cache memory, and the plurality of address buses comprise a data address bus and an instruction address bus.

In another respect, the invention is a method for using a single memory address bus for a plurality of access types. The method accepts one or more memory addresses on one or more respective ones of a plurality of address buses. If there are memory addresses simultaneously active on two or more of the plurality of address buses, then the method selects one of the simultaneously active addresses and connects the selected address to the single memory access port.

DETAILED DESCRIPTION OF A PREFERRED EMBODIMENT

Figure 2:
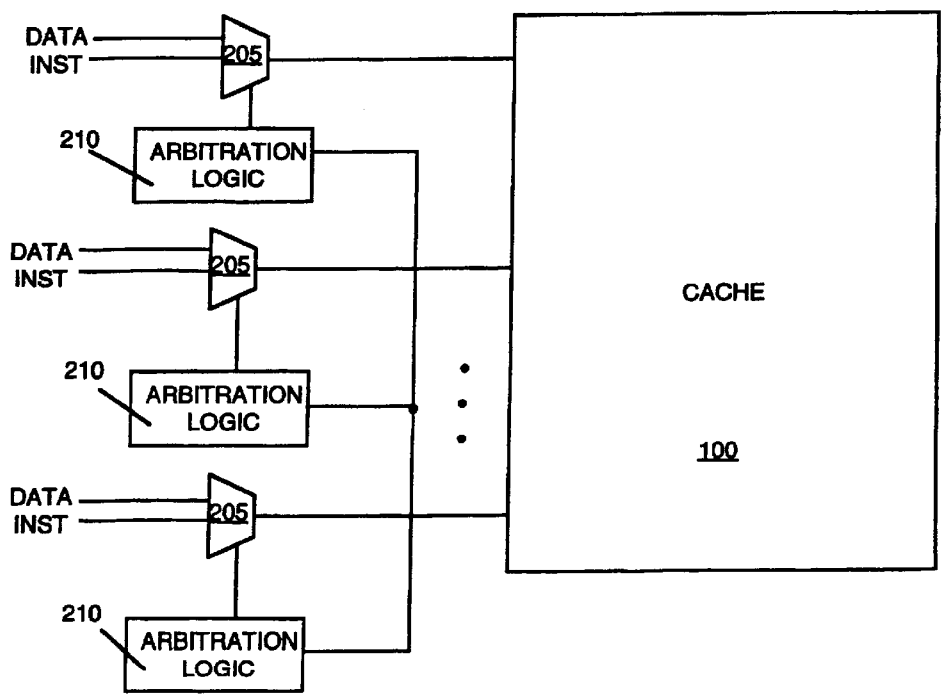
FIG. 2 is a block diagram of a unified cache memory with consolidated address ports for data and instructions, according to an embodiment of the invention.

FIG. 2 is a block diagram of a memory system 200, according to an embodiment of the invention. The memory system 200 includes the cache 100, which is a unified cache memory shown with its address port connections only, and port combination circuits. Each port combination circuit comprises a multiplexor 205 and an arbitration logic 210. On the left side of each multiplexor 205, as shown, are a data address bus DATA and an instruction address bus INST. On the right side of each multiplexor 205 is a memory connection. More specifically, the memory connection is a connection to an address port of the cache 100. The multiplexor 205 selectively couples one of the data address bus DATA or the instruction address bus INST to the connection to the address port of the cache 100. Each arbitration logic 210 produces one or more output signals, which are connected to a control input of a corresponding multiplexor 205. In this way, each arbitration logic 210 controls the selection of the multiplexor 205 to which the arbitration logic 210 is connected. The arbitration logic 210 can operate according to any arbitration scheme, preferably giving preference to the instruction address bus INST whenever the an instruction address bus INST and an data address bus DATA both seek access to the cache 100, because timely handling of instructions is generally more important to the overall performance of a computer.

Other inputs to the multiplexor are possible. For example, address buses for snoop operations and/or fill operations from a main system bus or higher level cache can be additional inputs to the multiplexors 205.

Figure 1:
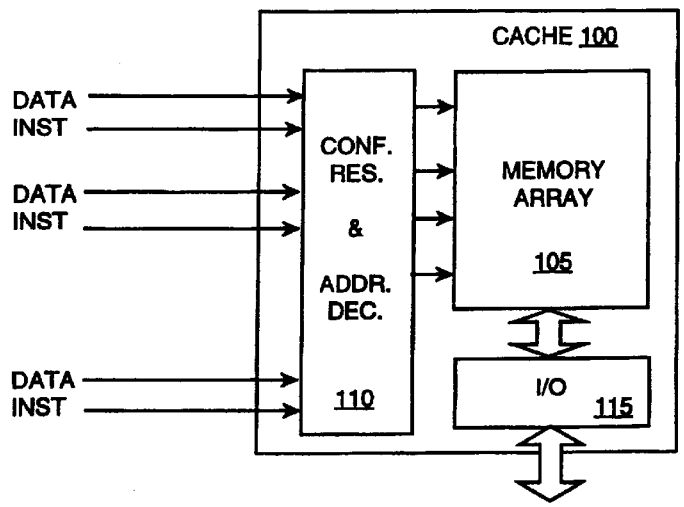
FIG. 1 is a block diagram of a unified cache memory with separate address ports for data and instructions.

In the memory system 200, the number of address ports on the cache 100 is decreased, compared to the memory system 100 (FIG. 1). As a result, the cache 100 contains significantly less address conflict detection and resolution circuitry, which makes available more space, weight and power for valuable memory space.

Figure 3:
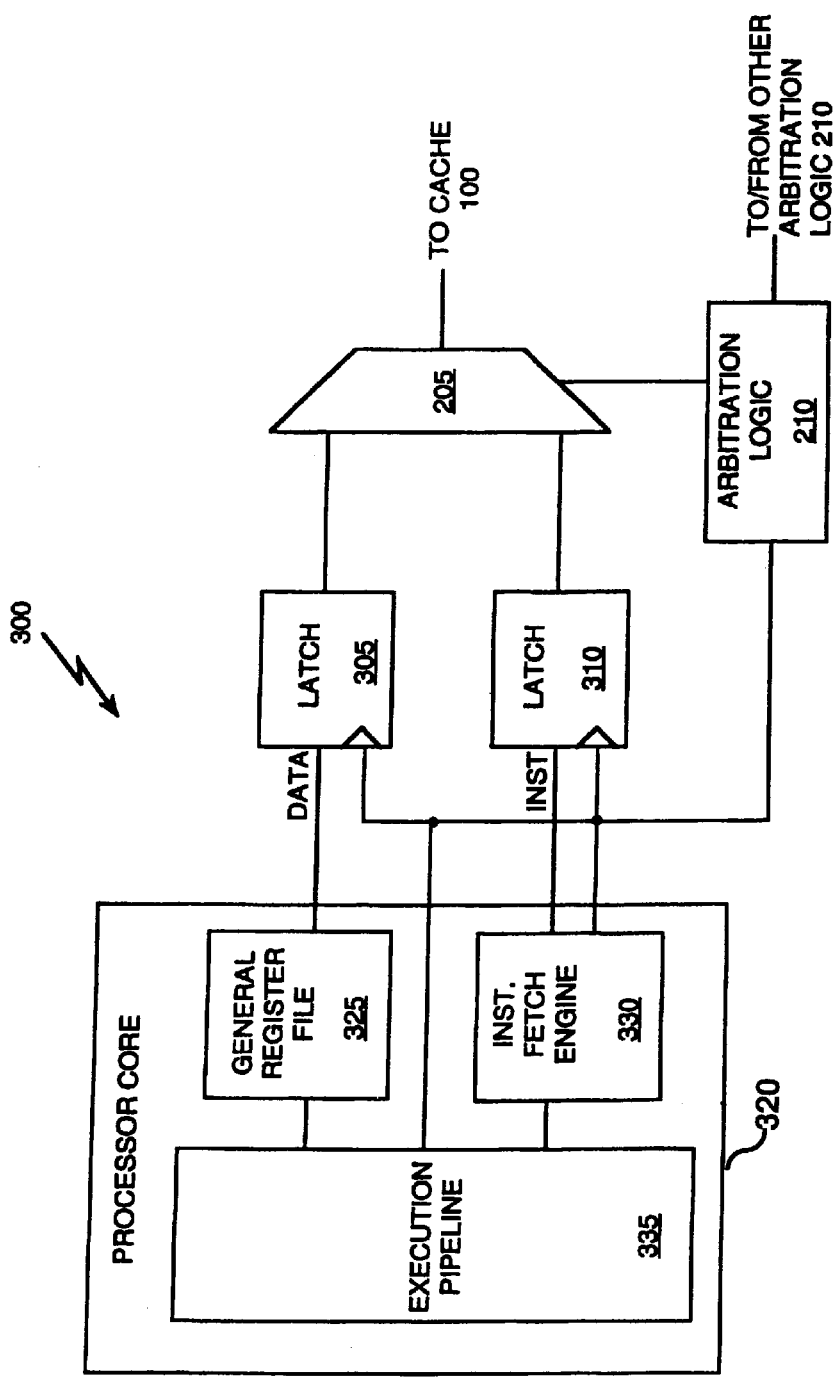
FIG. 3 is a block diagram of a port combination circuit and processor section, according to an embodiment of the invention.

FIG. 3 is a block diagram 300 of a port combination circuit and its surrounding circuitry in greater detail. In particular, latches 305 and 310 are included on the data address bus DATA and the instruction address bus INST, respectively. The data address bus DATA and the instruction address bus INST are connected to a section of a processor core 320. More specifically, the data address bus DATA is connected to a general register file 325 of the processor core 320, and the instruction address bus INST is connected to an instruction fetch engine 330 in the processor core 320. The instruction fetch engine 330 supplies instructions to an execution pipeline 335, which generally reads from, writes to and otherwise manipulates registers in the general register file 325 while executing instructions.

Various control signals are passed among the arbitration logic 210, the latches 305 and 310, the general register file 325, the instruction fetch engine 330 and the execution pipeline 335. Although a single line illustrates these connections, several physical lines may be involved. The execution pipeline 335 sends an enable signal to the latch 305 when the general register file transmits a data address to the latch 305. The instruction fetch engine 330 sends an enable signal to the latch 310 when the instruction fetch engine 330 transmits an instruction address to the latch 310. The arbitration logic 210 senses the enable signals and thereby knows when addresses are being supplied to the cache 100 from the processor core 320. When the arbitration logic 210 suppresses one of the accesses, the arbitration logic notifies the appropriate source in the processor core 320, so that the source can attempt the access at a later time. Most likely, the arbitration logic 210 suppresses a data access, in which case the arbitration logic 210 notifies the execution pipeline 325 of the suppression. Optionally, a latch (not shown) can be provided on the output of the multiplexor 205 for timing purposes.

Preferably, the arbitration logic 210 not only checks for address conflicts but also determines the type of operation to which the addresses pertains and checks for size conflicts. The type of operation is relevant because not all accesses to the same memory address are necessarily in conflict. For example, the same address can be read simultaneously by two observers, but the same address cannot be written by two sources simultaneously. Neither can the same address be reliably written and read simultaneously (unless perhaps special protocols for doing so are followed). The size of the piece of memory accessed is also relevant to conflicts, because the bandwidth of the I/O module 115 is limited. For example, assume that the width of the I/O bus coupled to the I/O module 115 is 128 bits. Then, if a read access to a first address returns a 96 bit result from the memory array 105 and a read access to a second address returns a 96 bit result form the memory array 105, then both reads cannot occur simultaneously. The size of the memory piece being accessed can typically be determined on the basis of the operation (or op code) associated with the access (e.g., load vs. long load).

To perform op code compares and size compares, the individual arbitration logics 210 are connected and coordinated together. In one embodiment, the individual arbitration logics 210 are combined in a single arbitration logic block that jointly controls all of the several multiplexors 205. Additional advantages can be realized in this way. First, size constraints among different data addresses or among different instruction addresses can be detected and arbitrated on a global basis. For instance, if the top data address bus DATA attempts a 96 bit write while the third address bus DATA attempts a 96 bit read, this size conflict can be detected and arbitrated. Second, unused address buses can be utilized more efficiently. Suppose for example that the top data address and the top instruction are in conflict but there is no access requested on the second multiplexor 205. In this case, the arbitration logic 210 could request to the processor core 320 that either the data address or the instruction address be redirected to the second, unused multiplexor 205. The benefit of this redirection is that it avoids stalling the processor core 320.

Whatever arbitration functions are not performed by the individual arbitration logics 210 outside the cache 100 can be performed inside the cache 100 by traditional means. If all arbitration functions are performed outside of the cache 100, then the cache 100 is internally simplified. An important advantage of reduced address conflict checking cost is realized so long as instruction and data accesses are merged outside the cache 100. The arbitration logics 210 need only manage this merge to realize this advantage. The extent to which other conflict checking is shifted from the cache 100 to the arbitration logics 210 is a matter that one skilled in the art can balance in any particular situation.

The terms and descriptions used herein are set forth by way of illustration only and are not meant as limitations. Those skilled in the art will recognize that many variations are possible within the spirit and scope of the invention as defined in the following claims, and their equivalents, in which all terms and phrases are to be understood in their broadest reasonable sense.

What is claimed is:

1. An apparatus for using a plurality of buses with a memory port of a memory, the apparatus comprising:
    a multiplexor connected to the plurality of buses wherein the plurality of buses comprise a data address bus and an instruction address bus, the multiplexor having a control input and a memory connection to the memory port; and
    a first logic circuit configured to determine access to the memory port among the plurality of buses and adapted to interface with other logic circuits, each of the first and other logic circuits associated with a respective memory port, wherein the first logic circuit produces an output signal tied to the control input of the multiplexor;
    wherein the first logic circuit is configured to detect a conflict between the instruction address bus and the data address bus, and is further configured to give access to the instruction address bus in response to detecting the conflict.

2. The apparatus of claim 1 wherein the logic circuit output causes the multiplexor to couple the instruction address to the memory port when an address is enabled on the instruction address bus.

3. The apparatus of claim 1 wherein the instruction address bus is coupled to an instruction fetch engine.

4. The apparatus of claim 1 wherein the data address bus is coupled to a processor register file.

5. The apparatus of claim 1 wherein the memory is a cache memory.

6. The apparatus of claim 5 wherein the memory is a unified memory that stores values of diverse types.

7. The apparatus of claim 6 wherein the diverse types comprise data and instructions.

8. The apparatus of claim 5 wherein the plurality of buses comprise a cache fill address bus and a cache snoop address bus.

9. The apparatus of claim 1 further comprising:
    a plurality of latches, each latch on a respective one of the plurality of buses.

10. The apparatus of claim 1 further comprising:
    a latch on a connection between the multiplexor and the memory.

11. The apparatus of claim 1 wherein the number of access connections is four.

12. The apparatus of claim 1, wherein each of the other logic circuits is connected to a respective multiplexor and is configured to use the respective multiplexor for controlling access to a respective memory port among a plurality of busses connected to the respective memory port.

13. A method for using a single memory port for a plurality of access types, the method comprising:
    accepting one or more memory addresses on one or more respective ones of a plurality of address buses;
    if there are memory addresses simultaneously active on two or more of the plurality of address buses, then selecting one of the simultaneously active addresses;
    connecting the selected address to the single memory port; and
    notifying a source of a memory address about the selected address.

14. The method of claim 13 wherein the plurality of address buses comprise a data address bus and an instruction address bus.

15. The method of claim 13 wherein the memory is a cache memory.

16. The method of claim 13 further comprising:
    latching the one or more addresses.

17. An apparatus for using a plurality of address buses with a single port of a memory, the apparatus comprising:
    a means for selectively coupling a single one of the plurality of address buses to the memory if there are memory addresses simultaneously active on two or more of the plurality of address buses;
    a means for controlling the means for coupling; and
    a means for notifying a source of a memory address about the selected address.

18. The apparatus of claim 17 wherein the plurality of address buses comprise a data address bus and an instruction address bus.

19. The apparatus of claim 17 wherein the memory is a cache memory.

20. An apparatus for controlling access to a unified cache storing data and instructions, the apparatus comprising:

a first multiplexor connected to a first data address bus and a first instruction address bus, the first multiplexor having a control input and a memory connection to a first port of the unified cache; and a first logic circuit configured to determine access to the first port among the data address bus and the instruction address bus and adapted to interface with other logic circuits, each of the other logic circuits associated with a respective multiplexor and port of the unified cache, wherein the first logic circuit produces an output signal tied to the control input of the first multiplexor.

21. The apparatus of claim 20, wherein the first logic circuit resolves address conflicts among requests transmitted on the first instruction address bus and the first data address bus.

22. The apparatus of claim 20, wherein the first logic circuit and the other logic circuits are configured to resolve a size conflict resulting from attempted accesses of the unified cache.

23. The apparatus of claim 22, wherein the size conflict comprises substantially simultaneous read requests for an amount of data that exceeds a bus size of an input/output bus outputting data from the unified cache.

24. The apparatus of claim 20, wherein the first logic circuit and the other logic circuits are configured to resolve an instruction conflict resulting from attempted accesses of the unified cache.

25. The apparatus of claim 24, wherein arbitrating to resolve an instruction conflict comprises utilizing an unused data address bus or instruction address bus connected to the unified cache through one of the multiplexors.

26. The apparatus of claim 20, wherein a processor is connected to the unified cache through at least the first data address bus and the first instruction address for transmitting one or more of instruction addresses and data addresses to the unified cache.

* * * * *